(12) United States Patent
Kuan et al.

(10) Patent No.: US 8,625,726 B2
(45) Date of Patent: Jan. 7, 2014

(54) LOW POWER RADIO FREQUENCY TO DIGITAL RECEIVER

(75) Inventors: Yen-Cheng Kuan, Los Angeles, CA (US); Zhiwei Xu, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/233,938

(22) Filed: Sep. 15, 2011

(65) Prior Publication Data

US 2013/0070875 A1 Mar. 21, 2013

(51) Int. Cl.
*H04B 1/16* (2006.01)
*H04B 14/04* (2006.01)
*H03M 3/02* (2006.01)

(52) U.S. Cl.
USPC .............................. 375/350; 375/247; 341/143

(58) Field of Classification Search
USPC ......... 375/247, 316, 344, 345, 349, 350, 355; 341/141, 143, 144, 155
See application file for complete search history.

(56) References Cited

U.S. PATENT DOCUMENTS

| | | | |
|---|---|---|---|
| 5,621,345 A | 4/1997 | Lee et al. | |
| 5,757,867 A * | 5/1998 | Caulfield et al. | 375/350 |
| 5,952,947 A | 9/1999 | Nussbaum et al. | |
| 6,215,430 B1 | 4/2001 | Smith et al. | |
| 6,218,972 B1 | 4/2001 | Groshong | |
| 6,243,430 B1 * | 6/2001 | Mathe | 375/346 |
| 6,429,797 B1 | 8/2002 | Wu | |
| 6,459,743 B1 | 10/2002 | Lipka | |
| 6,577,258 B2 | 6/2003 | Ruha et al. | |
| 6,611,570 B1 * | 8/2003 | Subramanian | 375/326 |
| 6,639,526 B1 | 10/2003 | Mayes | |
| 2004/0190660 A1 * | 9/2004 | Morris et al. | 375/350 |
| 2004/0192229 A1 * | 9/2004 | Morris et al. | 455/91 |
| 2006/0222116 A1 * | 10/2006 | Hughes et al. | 375/345 |
| 2008/0159453 A1 * | 7/2008 | Smith | 375/350 |

OTHER PUBLICATIONS

A 48-dB DR 80-MHz BW 8.88-GS/s Bandpass Delta-Sigma ADC for RF Digitization With Integrated PLL and Polyphase Decimation Filter in 40nm CMOS E. Martens, A. Bourdoux, A. Couvreur, P. Van Wesemael, G. Van Der Plas, J. Craninckz and J. Ryckaert 2011 Symposium on VLSI Circuits Digest of Technical Papers.
Efficient Discrete-Time Bandpass Sigma-Delta Modulator and Digital I/Q Demondulator for Multistandard Wireless Applications—Chanyong Jeong, Younghwan Kim, Soowon Kim. IEEE Transactions on Consumer Electronics, Issue 1 pp. 25,29 Feb. 2008.

* cited by examiner

*Primary Examiner* — Young T. Tse
(74) *Attorney, Agent, or Firm* — Wiess & Moy, P.C.

(57) ABSTRACT

A radio frequency to digital receiver has a modulator sampling a signal at a first rate. The receiver has at least one processing unit. The processing unit has a plurality of digital bandpass filters separating the signal and recombining the signal at a rate less than the first rate. The processing unit has a digital down converter adjusting frequency offset or centering the signal at the rate less than the first rate. The receiver has at least one rate control buffer coupled to adjacent processing units when two or more processing units are within the receiver.

16 Claims, 8 Drawing Sheets

LOW POWER RADIO FREQUENCY TO DIGITAL RECEIVER

BACKGROUND

Embodiments of this disclosure generally relate to a communication system, and more particularly, to a low power radio frequency to digital receiver which may perform arbitrary bandpass filtering in the radio frequency (RF) domain and may down convert the filtered RF signals in a digital domain.

A radio receiver may convert signals from a radio antenna to a useable form. Design architectures for converting signals, received from an antenna, may include a low noise amplifier (LNA), down conversion mixers, voltage controller oscillator (VCO), low pass filters (LPFs), synthesizer loop, reference generator, analog-to-digital converters (ADCs) and digital signal processor (DSP) which may have a demodulator. These blocks of RF units and analog baseband and mixed signal circuits in the architecture may consume a significant portion of design efforts and implementation cost for an integrated receiver design. The use of non-digital circuits may also raise an issue of limited voltage (amplitude) headroom as the process technology advances and supply voltage decreases.

In one architecture, designed to reduce complexity and alleviate headroom issues by eliminating most RF and analog baseband circuits, input signals from the antenna may be amplified by an LNA and directly sampled by an ADC. Most of the analog signal processing may be deferred into the DSP. This architecture may introduce stringent requirements on the ADC. The sampling frequency of the ADC may be the Nyquist rate of RF carrier frequency, which may be higher than the signal bandwidth. It may result in an overhead of design complexity and power consumption of the synchronous sampling clock for the ADC. Even though the under sampling strategy may be adopted, extra noise may be folded into the baseband that may degrade the signal-to-noise ratio (SNR) of the receiver.

Therefore, it would be desirable to provide a system and method that overcomes the above problems.

SUMMARY

A radio frequency to digital receiver has a modulator sampling a signal at a first rate. The receiver has at least one processing unit. The processing unit has a plurality of digital bandpass filters separating the signal and recombining the signal at a rate less than the first rate. The processing unit has a digital down converter adjusting frequency offset or centering the signal at the rate less than the first rate. The receiver has at least one rate control buffer coupled to adjacent processing units when two or more processing units are within the receiver.

A multi-tone up converter has a digital up converter configured for receiving a signal. A plurality of digital bandpass filters is coupled to the digital up converter configured for separating the signal. A digital router is coupled to the plurality of bandpass filters for combining the signal. A digital-to-analog converter is coupled to the digital router for transforming the signal into an analog signal.

A method for reducing power consumption on a radio frequency receiver comprising: receiving a signal; filtering the signal; sampling the signal at a first rate; and, in at least one processing unit: separating the signal into sub-bands at a processing rate less than the first rate; recombining the signal from the sub-bands at the processing rate; and correcting a frequency offset or centering the signal at the processing rate.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
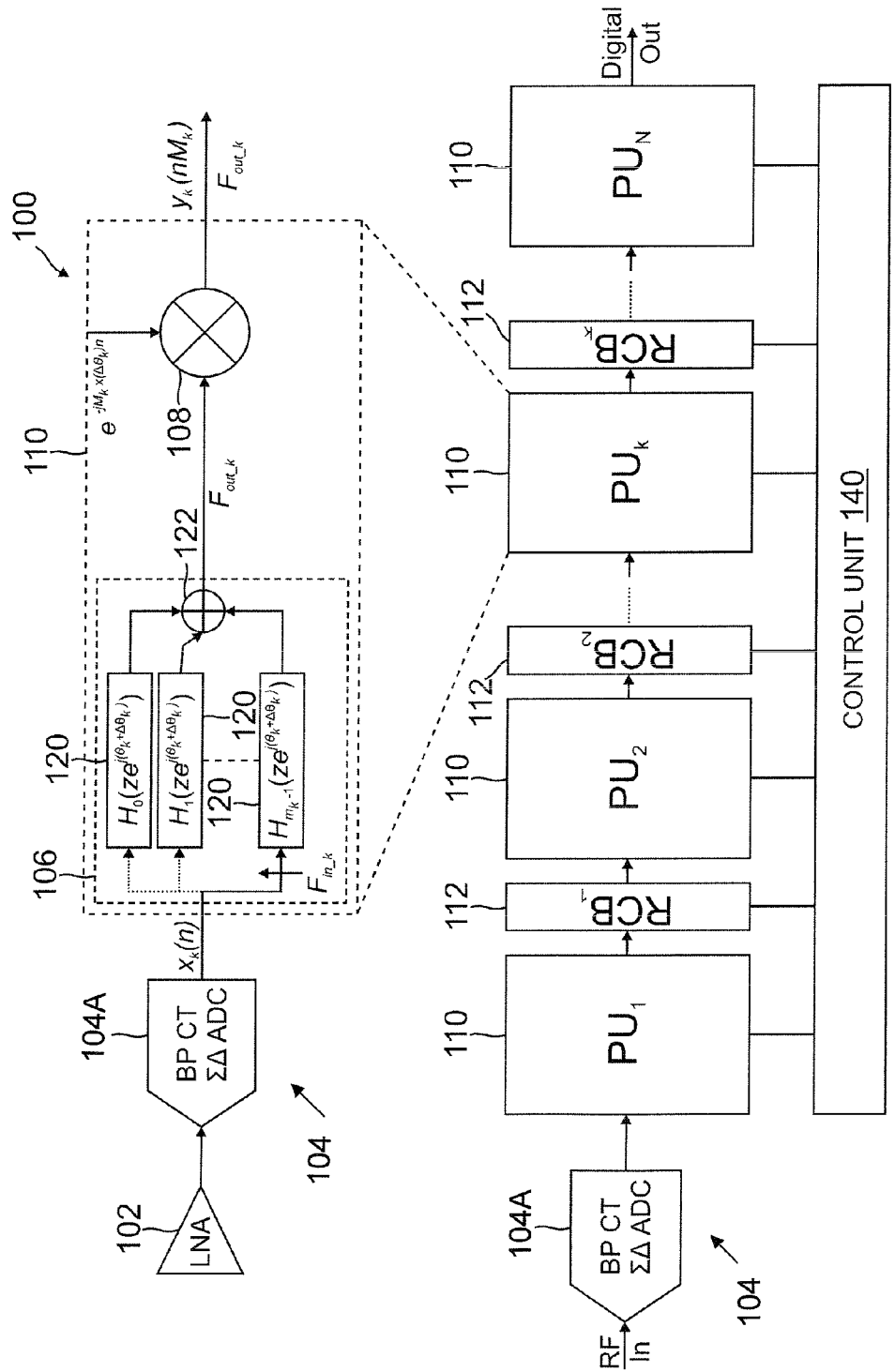
FIG. 1 is a block diagram of a generalized architecture of a receiver having homogeneous processing.

Referring to FIG. 1, a block diagram of a generalized architecture of a receiver 100 having homogeneous processing may be shown. The receiver 100 may have a low power radio frequency (RF) to digital baseband design. The receiver 100 may be described below in regards to a mobile platform. The receiver 100 may be placed within a smartphone, cellphone or the like that processes incoming RF communications. The receiver 100 may also be used in software-defined radios (SDRs), smart radios, in-vehicle communications, infotainment for vehicles, etc.

The receiver 100 may perform the process of bandpass filtering, sampling, down-converting and decimating in a low complexity and power efficient manner. Unlike existing approaches, which may consist of several building blocks across RF, analog and digital domains and run at very high speed clock rates in digital circuits, the receiver 100 may utilize a combination of multirate digital signal processing (MDSP) and a bandpass continuous time delta sigma analog-to-digital converter (BP-CT-ΔΣ-ADC) to execute the above processes in a streamline and transparent mechanism running at the clock rate of interesting signal bandwidth. This may provide shorter latency from input signals to output data, smaller number of required building blocks and less power consumption than previous architectures. Furthermore, the design may remove stringent requirements placed on analog-to-digital converters (ADC). The receiver 100 may have building blocks that are either analog or digital circuits reducing the RF circuits making the receiver 100 resistant to the process variation in modern very large scale integration (VLSI) technologies.

The receiver 100 may perform arbitrary bandpass filtering (BPF) in an RF domain. In the embodiment shown in FIG. 1, the receiver 100 may down convert the filtered RF signals in the digital domain. The receiver 100 may employ a mixed-signal circuit design strategy and process the signals at the Nyquist rate. The receiver 100 may provide significant advantages of low power consumption and low complexity design. The receiver 100 may be based on the techniques of a MDSP and a BP-CT-ΔΣ-ADC 104.

Instead of processing the signals at a rate that is a multiple of the carrier frequency, receiver 100 may deal with the signals at a rate that covers the signal bandwidth. This decrease in processing rate may save the processing bandwidth and reduce the overall power consumption. The low power RF to digital baseband receiver 100 may also have building blocks that may be programmed and adjusted to the desired input frequency region and the output data rate through software defined modules. The MDSP portion of the receiver 100 may be reconfigured to become a multi-tone up-converter, which may serve as a tone generator for the calibration process in the beginning of the receiver 100 operation.

In the embodiment provided in FIG. 1, incoming RF signals may be introduced through an antenna, not shown. The antenna may receive radio waves and convert them into electric current. The antenna may be coupled to an amplifier 102. The amplifier 102 may be a low noise amplifier (LNA) 102 and may increase the power of a signal received by the antenna of the receiver 100.

The LNA 102 may be coupled to a modulator 104. The modulator 104 may receive the signal from the amplifier 102. In the embodiment shown in FIG. 1, the modulator 104 may be a BP-CT-ΔΣ-ADC 104A and may process the signal by filtering and sampling it. By bringing the signal into a digital domain, the BP-CT-ΔΣ-ADC 104A may provide noise immunity, robustness and flexibility and may introduce potential improvements in performance, power consumption and cost reduction. The BP-CT-ΔΣ-ADC 104A may allow high speed operation while keeping power consumption and chip area low. The samples of the filtered signal may be generated at the BP-CT-ΔΣ-ADC 104A output at the rate of $F_{in\_k}$ as shown as $X_k(n)$. The output may offer a high degree of programmability and may be ideal for multi-standard RF receivers 100.

The BP-CT-ΔΣ-ADC 104A may down convert the incoming signal received by the LNA 102 into baseband. The modulator 104 may be suited to perform bandpass ADC on narrow band signals. The filtered signal may be digitized by a continuous-time delta sigma (CT-ΔΣ) portion of the modulator 104. The BP-CT-ΔΣ-ADC 104A may mix the input signal and digitize it, which may require amplification by the LNA 102. The BP-CT-ΔΣ-ADC 104A may make use of an integer number of sinusoidal pulses for feedback. The feedback basis function may be inherently bandpass. This may considerably improve the performance of the modulator 104 in the presence of time delay jitter and pulse-width jitter. Also, the sampling frequency of the modulator 104 may be less than the center frequency to which the modulator 104 is tuned.

The modulator 104 may be coupled to a digital polyphase filter (DPF) 106 as shown in the embodiment of FIG. 1. The DPF 106 may receive the output of the BP-CT-ΔΣ-ADC 104A, which was $X_k(n)$. The DPF 106 may implement MDSP that down converts and decimates the signal. The filter 106 may split the input signal $X_k(n)$ into a number of equidistant sub-bands 120 which are sub-sampled by a factor of M so that they may be critically sampled. The sub-bands 120 may be an array of bandpass finite length filters (FLFs) 120 that separate the input signal, $X_k(n)$, into multiple components, each one filtering the original signal with different filter coefficients. For example, the filter coefficient may be $H_n(ze^{j(\Theta k+\cdots)})$. As shown in FIG. 1, the first filter coefficient may be $H_0(ze^{j(\Theta k+\cdots)})$. The DPF 106 may recombine the signal through a combiner 122 from the sub-bands 120 at a rate of $F_{out\_k}$. $F_{out\_k}$ may be differentiated from $F_{in\_k}$ and $F_{out\_k}$ may be a rate less than $F_{in\_k}$.

Figure 2:
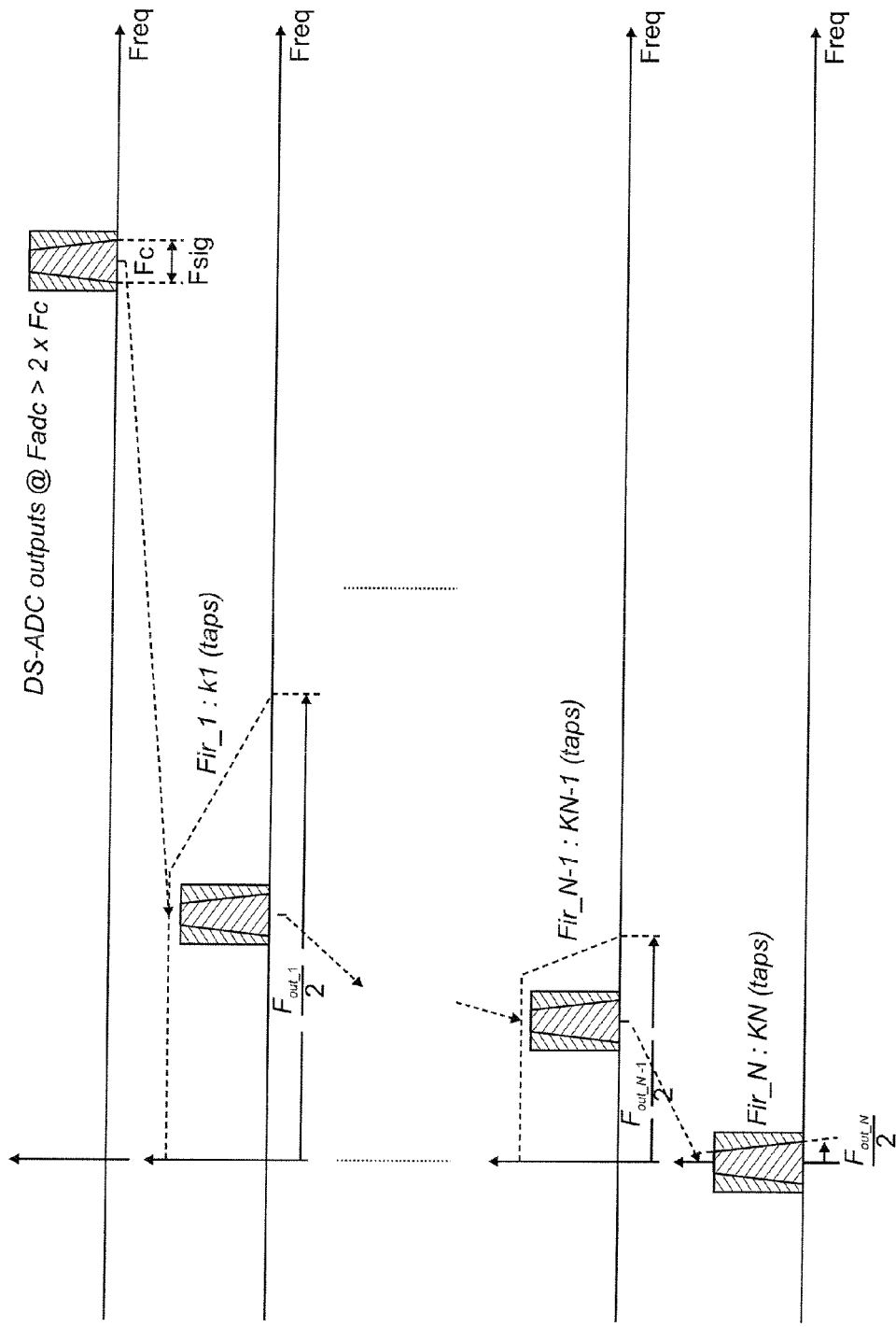
FIG. 2 is a graph showing the process of converting the signal from the carrier frequency to the baseband through multiple stages each of which is conducted by a processing unit.

Each of the bandpass filters 120 of the DPF 106 may operate at the rate of $F_{out\_k}$. $F_{out\_k}$ may be larger than the interesting signal bandwidth. $F_{out\_k}$ may be usually much smaller than $F_{in\_k}$ and may be chosen so that $F_{in\_k}$ is a multiple of $F_{out\_k}$. The number of FLFs 120, denoted by M, may be defined as the ratio of $F_{in\_k}$ over $F_{out\_k}$. In the DPF 106, there may be a total of M sub FLFs 120, each of which is running at the rate of $F_{out\_k}$. The BP-CT-ΔΣ-ADC 104A outputs, $X_k(n)$, are time multiplexed into each sub-band 120 as indicated by the dotted lines showing the separation of the signal. FIG. 2 is a graph showing the process of converting the signal from the carrier frequency to the baseband through multiple stages (from up to down) each of which is conducted by a processing unit (PU) 110. Finite impulse responses (FIRs) may be used by the DPF 106 for taking samples from the incoming signal, $X_k(n)$. The outputs from the FLFs 120 may be then combined at the combiner 122 at the rate of $F_{out\_k}$.

In the embodiment shown in FIG. 1, the DPF 106 may be coupled to a digital down converter (DDC) 108 wherein both may operate at the rate of $F_{out\_k}$. The DDC 108 may convert the output of the DPF 106 into a digitized real signal centered at an intermediate frequency (IF) or a baseband complex signal centered at zero frequency. The DDC 108 of the receiver 100 may then provide output, $y_k(nM_k)$, at the rate of $F_{out\_k}$.

The receiver 100 may be placed within a device itself or may be part of a homogeneous PU 110 based architecture where multiple DPFs 106 and DDCs 108 may exist in series with an amplifier 102 and modulator 104. In one embodiment as shown, the BP-CT-ΔΣ-ADC 104A may be coupled to a first PU 110, $PU_1$, and subsequently to many other PUs 110. Each PU 110 may process the signal. A rate conversion buffer (RCB) 112 may be coupled between the PUs 110 within the receiver 100. The RCBs 112 may be used to manipulate the signal at one sample rate and convert it to a new sample rate. The number of PUs 110 and RCBs 112 may be adjusted. A digital output may be provided by the combination of PUs 110 and RCBs 112.

As shown in FIG. 1, the receiver 100 may have one PU 110 or many PUs 110. The PUs 110 may each have the plurality of digital bandpass filters 120 within the DPF 106. The plurality of digital bandpass filters 120 may separate a signal incoming at a rate of $F_{in\_k}$ and may recombine the signal at a rate of $F_{out\_k}$ that is less than the rate of the incoming signal, $F_{in\_k}$. $F_{in\_k}$ and $F_{out\_k}$ may be different for each PU 110. The DDCs 108 within the PUs 110 may adjust the frequency offset or may center the signal at a rate less than the rate of the incoming signal, $F_{out\_k}$. At least one RCB 112 may be coupled to adjacent PUs 110 when two or more PUs 110 are within the receiver 100.

The receiver 100 may include a controller 140. The controller 140 may be incorporated into the receiver 100 when two or more PUs 110 are being operated. Depicted within FIG. 1, the controller 140 may be coupled to each of the PUs 110 and RCBs 112 within the receiver 100. This connection may allow for the configuration of the PUs 110 and RCBs 112. When configured, the rates at which the signal is processed may be adjusted.

The controller 140 may be programmed in software, hardware or combination of both. In a software implementation, the code may be implemented on a non-transitory readable storage medium. The non-transitory computer-readable storage medium of the controller 140 may include, but is not limited to, volatile memory, non-volatile memory, magnetic and optical storage devices, or other media capable of storing code and/or data now known or later developed. The code may be read and executed by a computer system that performs the methods and processes embodied as data structures and code and stored within the non-transitory computer-readable storage medium. Furthermore, the methods and processes for the controller 140 may be included in hardware modules. These may include application-specific integrated circuit (ASIC) chips, field-programmable gate arrays (FPGAs), and other programmable-logic devices now known or later developed.

The controller 140 may configure each PU 110 by setting up the digital bandpass filters 120 and DDCs 108. In one embodiment, the PUs 110 and RCBs 112 may be configured through another method, for example, hardwired. The controller 140 may bypass a DDC 108 in a PU 110 by adjusting an incoming rate as a multiple of a processing rate of a current PU 110 and a carrier frequency as a multiple of the processing rate of the current PU 110 when the current PU 110 is coupled to a modulator 104. Alternatively, the controller 140 may adjust a processing rate of a previous PU 110 as a multiple of the processing rate of the current PU 110 and may adjust an intermediate frequency as a multiple of the processing rate of the current PU 110.

A received signal may be separated within each PU 110 by time multiplexing. When the PU 110 is coupled with the modulator 104, the sampled signal from the modulator 104 may be provided into each sub-band 120 of the DPF 106. Otherwise, outputs of a previous PU 110 may be time multiplexed into the sub-bands 120 of the DPF 106 of the current PU 110.

When multiple PUs 110 are used within the receiver 100, the total of M sub finite length filters 120 may be running at a rate $F_{out\_k}$ less than the incoming rate $F_{in\_k}$. M may be a ratio of the first rate over a processing rate of a current PU 110 when the PU 110 is next to the modulator 104. When the PU 110 is not coupled to the modulator 104, for example, $PU_2$ 110, $PU_k$ 110 or $PU_N$ 110, M may be a ratio of a processing rate of a previous PU 110 over the processing rate of the current PU 110.

Described above, the modulator 104 may process the signal at a first rate. The first rate may be greater than a carrier frequency. The PUs 110, having the plurality of digital bandpass filters 120 and DDCs 108, may process the signal at a rate greater than or equal to a Nyquist rate of a bandwidth of the signal. Typically, this rate may be less than the carrier frequency.

The DDCs 108 in each PU 110 may be running and generating outputs at a same rate as the M sub finite length filters 120 in the same PU 110. In one embodiment, the DDC 108 in each PU 110 may center the signal at zero frequency when the processing unit is last to generate final outputs. Otherwise, the DDCs 108 may correct a frequency offset to a desired intermediate frequency. The first rate may be larger than a carrier frequency. A processing rate of each PU 110 may cover a bandwidth of the signal and may be less than the carrier frequency.

Figure 3:
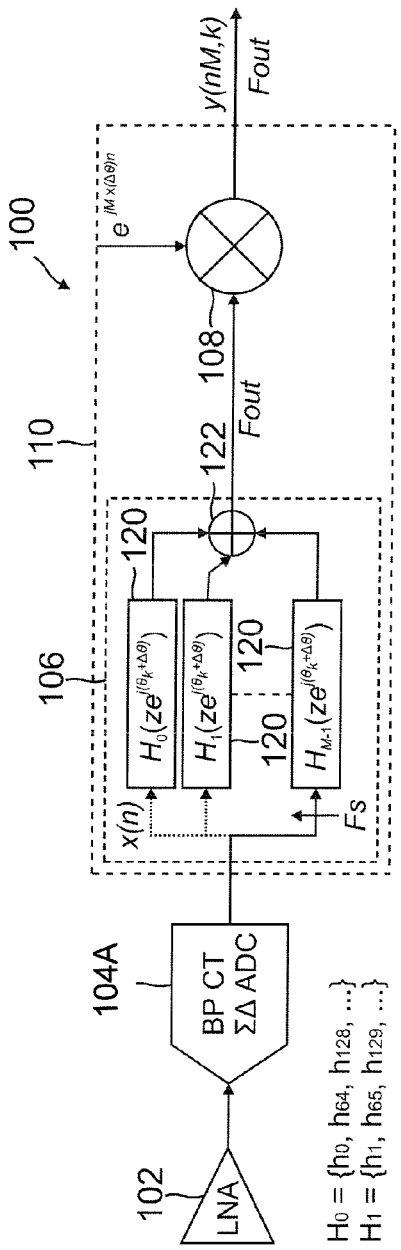
FIG. 3 is a block diagram of a specific instance of the receiver.

Turning now to FIG. 3, a block diagram of a specific instance of the receiver 100 may be described. The receiver 100 may operate with one PU 110. An RF signal may be received by an antenna, not shown. Coupled to the antenna may be a LNA 102. The LNA 102 may increase the signal received from the antenna. A modulator 104 may be coupled to the LNA 102. A BP-CT-ΔΣ-ADC 104A may process the signal from the LNA 102 by filtering and sampling it. The signal may be processed at a first rate, $F_S$. $F_S$ may be a multiple of the carrier frequency.

The signal, after processed by the modulator 104, may be provided to the DPF 106. The output of the modulator 104 may be x(n). In the embodiment shown in FIG. 3, the signal may be processed by the FLFs 120. The FLFs 120 may represent sub-bands wherein each one filters the original signal with different filter coefficients. For example, the filter coefficient may be $H_n(ze^{j(\Theta k + \cdots)})$. As shown in FIG. 3, the first filter coefficient may be $H_0(ze^{j(\Theta k + \cdots)})$. In the embodiment, the sub-bands 120 may be presented as sixty-four discrete units. For example, each sub-band 120 may sample at a factor of sixty-four for critical sampling. The signal may be recombined from the sixty-four sub-bands 120 at a second rate, $F_{OUT}$, by the combiner 122. The number of sub-bands 120, sixty-four, may be equivalent or proportional to the first rate, $F_S$, over the second rate $F_{OUT}$. The recombined signal may be provided to the DDC 108 and sent as output, y(nM,k). $F_S$ may be a multiple of the carrier frequency and $F_{OUT}$ may cover a bandwidth of the signal.

Figure 4:
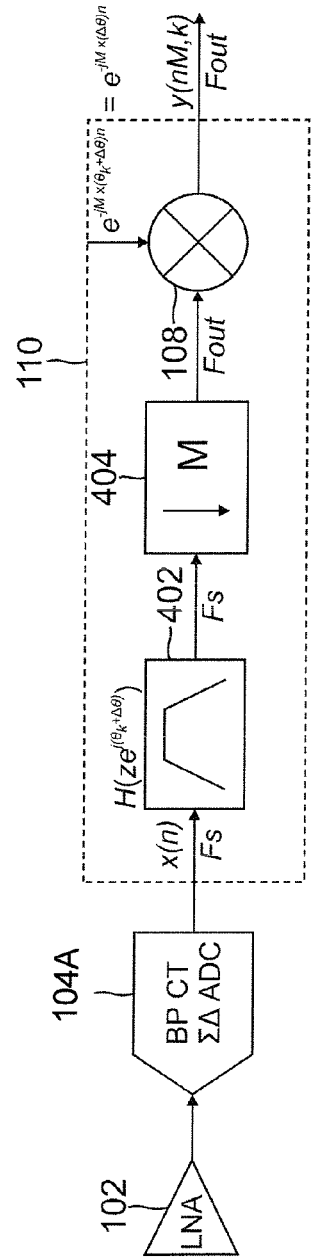
FIG. 4 is a block diagram of an equivalent combination of the receiver.

The overall DPF 106 operation may be equivalent to the combination of a digital bandpass filter (DBF) 402 and M-to-1 digital decimator (DDEC) 404 shown in the embodiment of FIG. 4. As shown, the signal may be received from an antenna by a LNA 102. The BP-CT-ΔΣ-ADC 104A may digitize the signal and may provide it to the DBF 402 of the PU 110. The signal, x(n), may be provided at a rate of $F_S$ described above.

The DBF 402 may perform operations to filter the signal at a defined passband. Coupled to the DBF 402 may be the DDEC 404. The DDEC 404 may reduce the number of samples in a discrete-time signal received from the DBF 402. The DDEC 404 may bring the signal received from the DBF 402 to the baseband. The reduction may be proportional to M, which was defined as $F_S$ over $F_{OUT}$. The DDC 108 coupled to the DDEC 404 may then down convert the signal at the rate of $F_{OUT}$. The DDC 108 may then provide output, y(nM,k). The combination of both the DBF 402 and DDEC 404 may be equivalent to the DPF 106. The DBF 402 and DDEC 404 may run at the rate of $F_S$. Because both are running at a faster rate of $F_S$, however, the DPF 106 of FIG. 3 running at the rate of $F_{OUT}$ consumes less power than the combination of the DBF 402 and DDEC 404 of FIG. 4.

Figure 5:
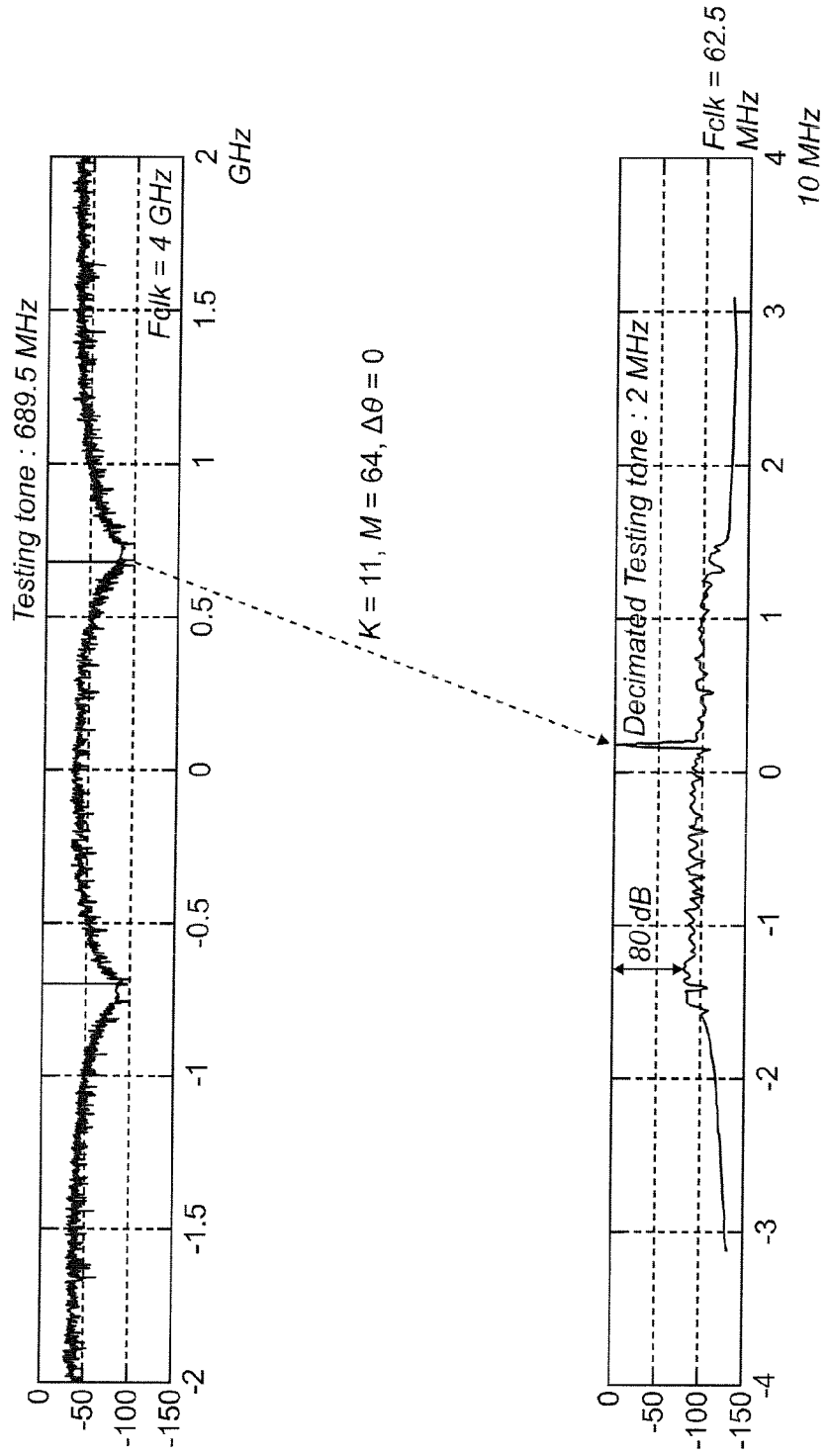
FIG. 5 is a graph of simulation results for a specific instance of the receiver.

The filter coefficients to each sub-band or FLF 120 may be the time multiplexed values of the corresponding DBF 402 coefficients. In one embodiment, the DBF 402 coefficients may be rotated or up converted versions of the digital low pass filter (DLF) coefficients. The DLF may have the same filter bandwidth as the DBF 402, but processes the down converted samples at the baseband. The rotated angle may be $\theta_k + \Delta\theta$, where $\theta_k$ is equal to $2\pi \times k \times F_S/M$, and $\Delta\theta$ may be the difference between the carrier frequency ($F_C$) and $\theta_k$. FIG. 5 is a graph of simulation results for the receiver 100. The graph shows the combination of processes of the BP-CT-ΔΣ-ADC 104A and DPF 106.

Figure 6:
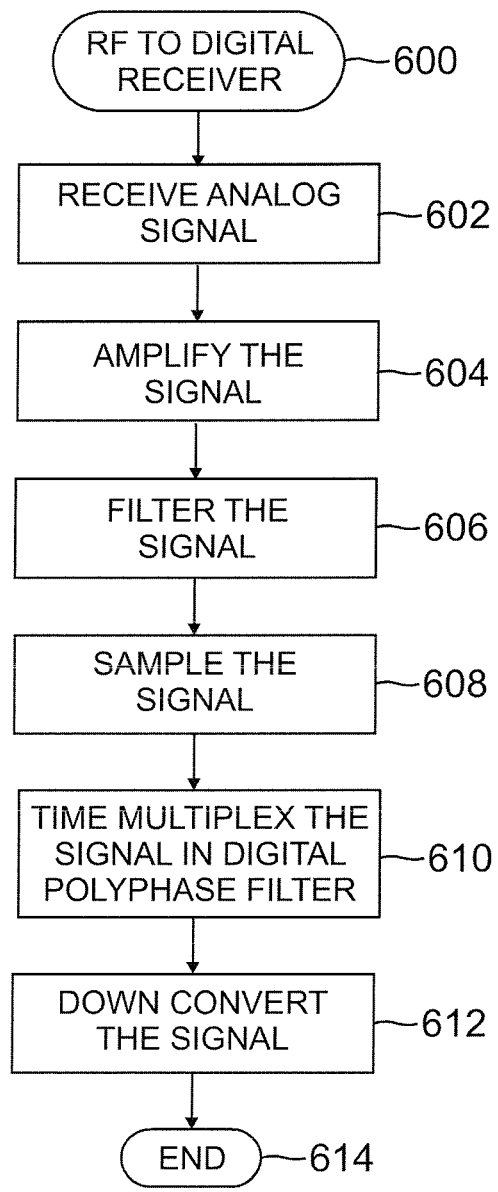
FIG. 6 is a process diagram showing operation of the receiver.

Referring to FIG. 6, a process diagram showing operation of the receiver 100 may be described. The processes for the receiver 100 may begin at block 600. At block 602, an antenna of the receiver 100 may receive an RF signal. The RF signal may be amplified by a LNA 102 at block 604. The signal may be filtered at block 606. The signal may be sampled at block 608. The filtering and sampling of the signal may be processed by the BP-CT-ΔΣ-ADC 104A.

At block 610, the signal may be time multiplexed in a digital polyphase filter. The DPF 106 may separate the digitized signal received from the modulator 104 into sub-bands 120. A signal may be created from those sub-bands 120 through combiner 122 of the DPF 106. The recombined signal may be down converted at block 612. The output of DDC 108 may then be further processed or may be used by applications on the device. The processes may end at block 614.

Figure 7:
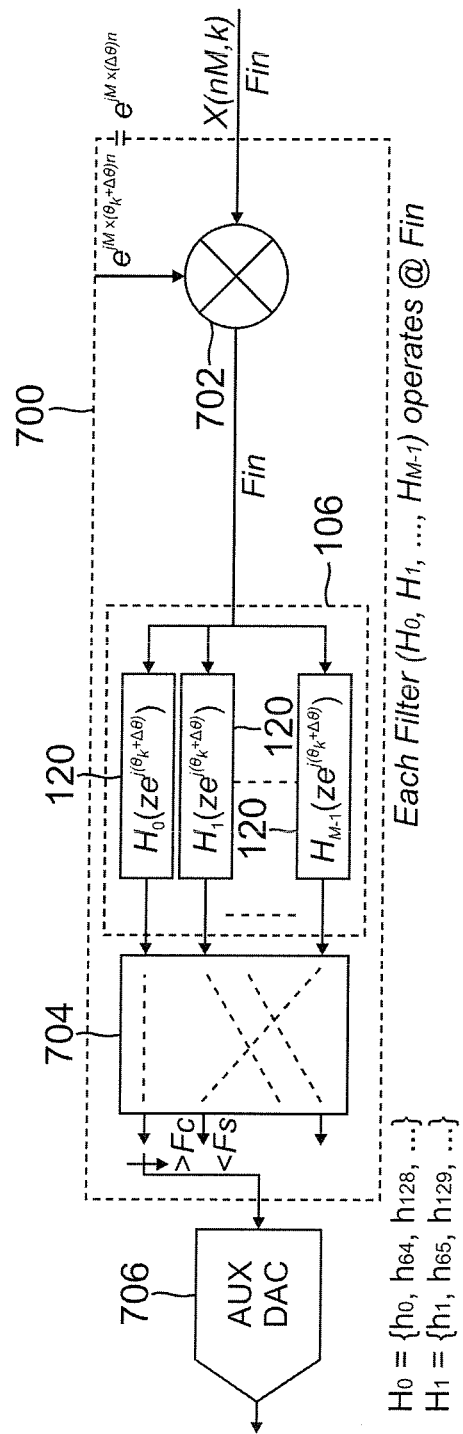
FIG. 7 is a block diagram of a RF tone generator.

Turning to FIG. 7, an RF tone generator 700 may be described. The signal paths of the receiver 100, described earlier, may be reconfigured to provide the generator 700. The RF tone generator 700 may include a digital up converter (DUC) 702, DPF 106 and digital router (DR) 704. An auxiliary digital-to-analog converter (AUX DAC) 706 may be coupled to the generator 700 through the DR 704. A digital signal, x(nM,k) may provided to the DUC 702. The signal may be mixed with a complex signal by the DUC 702 and provided to the DPF 106 at the rate of $F_{in}$.

In the embodiment of FIG. 7, the signal paths for the DPF 106 and DDC 108 of the receiver 100 may be easily reconfigured in the opposite direction so that the overall receiver 100 may become a RF tone generator 700 with the assistance of a digital-to-analog converter (DAC). Each sub-band 120 of the DPF 106 may take a portion of the incoming signal. The sub-bands 120 may be coupled to the DR 704. The DR 704 may multiplex the output of the sub-bands into a single signal. Coupled to the DR 704 may be the AUX DAC 706. The AUX DAC 706 may take the signal and convert it into analog form. The signal may be provided to a transmitter. The transmitter may convert electrical signals into RF communications. The rate of $F_{in}$, is smaller than the RF tone frequency, which may reduce power consumption.

Figure 8:
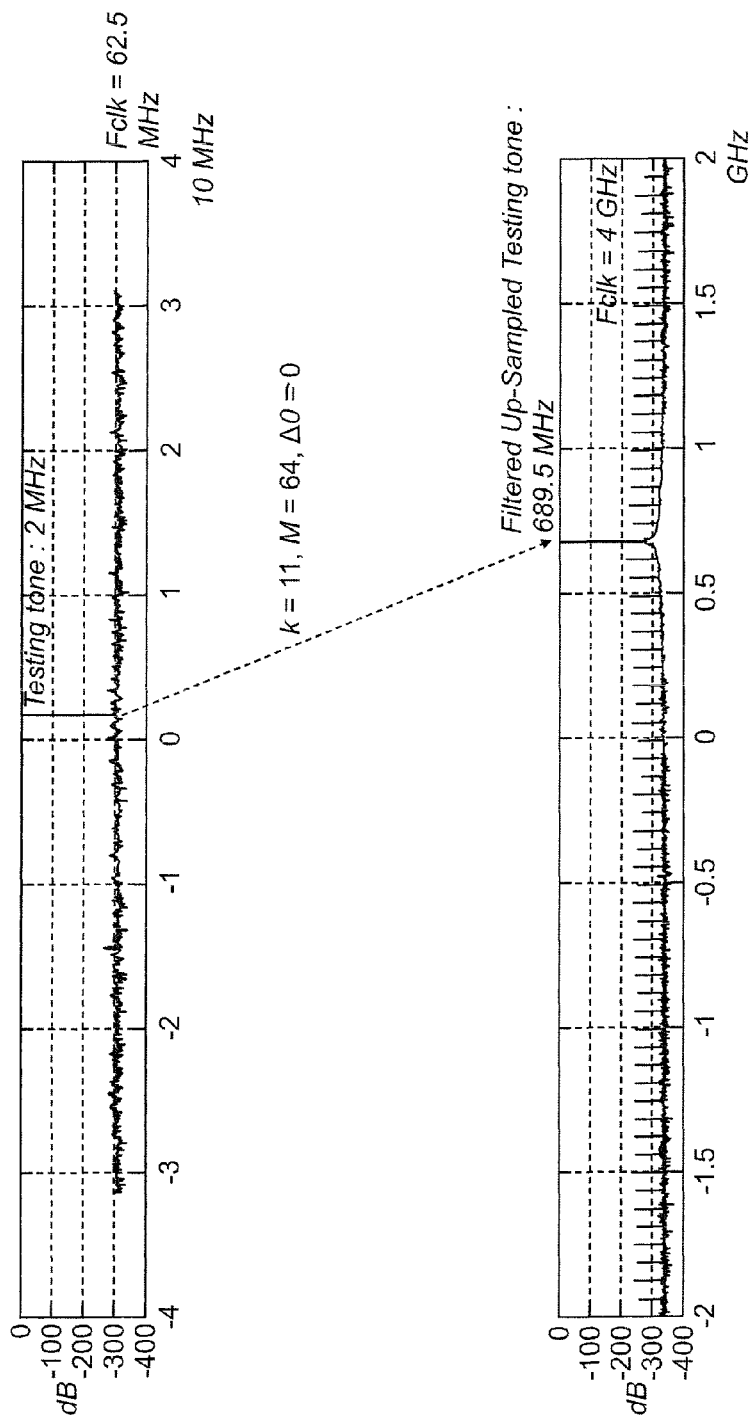
FIG. 8 is a process diagram showing operation of the RF tone generator.

FIG. 8 is a graph of simulation results for the RF tone generator 700. The outputs of this tone generator 700 may serve as the testing signals to inputs of the LNA 102 or BP-CT-ΔΣ-ADC 104 for the calibration process in the beginning of the receiver 100 operation.

Figure 9:
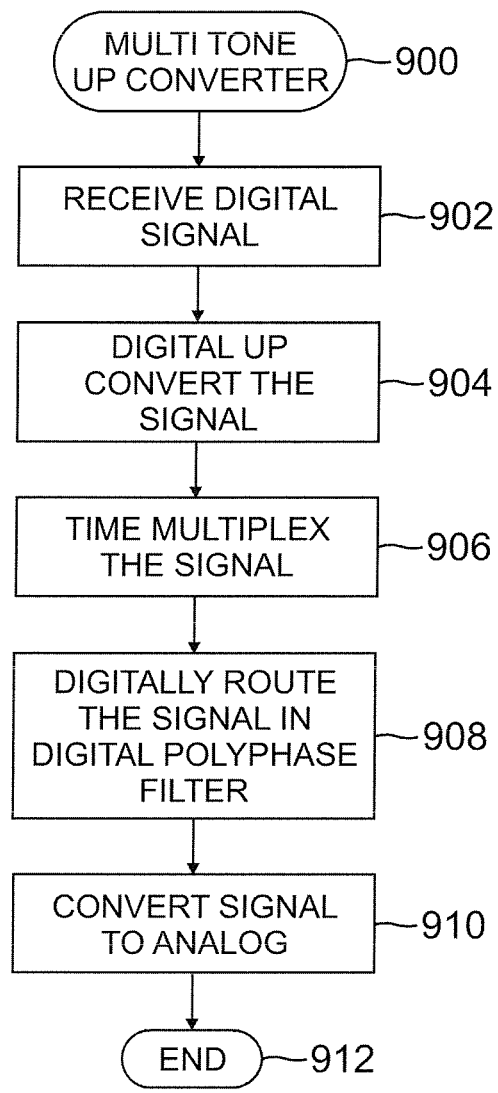
FIG. 9 is a graph of simulation results for the RF tone generator.

Referring to FIG. 9, a process diagram showing operation of the RF tone generator 700 may be described. The processes for the generator 700 may begin at block 900. At block 902, the DUC 702 of the generator 700 may receive a digital signal. At block 904, the DUC 702 may properly format the digitized signal by up converting it. The signal may be time multiplexed by the DPF 106 at block 906. The DPF 106 may be repurposed for the generator 700 and may separate the signal at the rate of $F_{in}$.

At block 908, the signal may be digitally routed through the DR 704 in a digital polyphase filter. A recombination of the signal at greater rate than $F_{in}$ may be taken by the DR 704. Because of the lower processing speeds at the initial processing stages, power may be saved. At block 910, the signal may be converted to an analog signal by the AUX DAC 706. The processes may end at block 912.

While embodiments of the disclosure have been described in terms of various specific embodiments, those skilled in the art will recognize that the embodiments of the disclosure may be practiced with modifications within the spirit and scope of the claims.

What is claimed is:

1. A digital receiver comprising:
 a modulator sampling a signal at a first rate;
 at least one processing unit comprising:
   a plurality of digital bandpass filters separating the sampled signal and recombining the sampled signal at a rate less than the first rate, and
   a digital down converter adjusting frequency offset or centering the recombined signal at the rate less than the first rate; and
 at least one rate control buffer coupled to adjacent processing units when two or more processing units are within the receiver.

2. The digital receiver of claim 1, further comprising a controller configuring connections between the at least one processing unit and the at least one rate control buffer when two or more processing units are within the receiver.

3. The digital receiver of claim 1, further comprising an amplifier for receiving and amplifying the signal before the modulator samples the signal.

4. The digital receiver of claim 1, wherein the modulator is a bandpass continuous time delta sigma analog-to-digital converter.

5. The digital receiver of claim 1, wherein the plurality of digital bandpass filters in each processing unit is provided in a form of a digital polyphase filter.

6. The digital receiver of claim 1, wherein the plurality of digital bandpass filters in each processing unit comprises a total of M sub finite length filters each of which is running at the rate less than the first rate, wherein M is a ratio of the first rate over a processing rate of a current processing unit when the current processing unit is next to the modulator, otherwise, M is a ratio of a processing rate of a previous processing unit over the processing rate of the current processing unit.

7. The digital receiver of claim 6, wherein inputs to the M sub finite length filters in each processing unit are provided by time multiplexing outputs of the modulator when the current processing unit is next to the modulator, otherwise, time multiplexing outputs of the previous processing unit.

8. The digital receiver of claim 1, wherein the modulator samples the signal at the first rate which is greater than a carrier frequency, and the plurality of digital bandpass filters and the digital down converter within each processing unit process the sampled signal at a rate greater than or equal to a Nyquist rate of a bandwidth of the signal but less than the carrier frequency.

9. The digital receiver of claim 1, wherein the digital down converter in each of the at least one processing unit is running and generating outputs for the at least one processing unit at a same rate as M sub finite length filters in a current processing unit of the at least one processing unit.

10. The digital receiver of claim 1, wherein the digital down converter in each of the at least one processing unit centers the recombined signal at zero frequency when the at least one processing unit is last to generate final outputs, otherwise, corrects a frequency offset to a desired intermediate frequency.

11. The digital receiver of claim 1, wherein the first rate is larger than a carrier frequency and a processing rate of each processing unit covers a bandwidth of the signal and is less than the carrier frequency.

12. A method for reducing power consumption on a radio frequency to digital receiver, the method comprising:
 receiving a signal;
 filtering the received signal;
 sampling the filtered signal at a first rate;
 in at least one processing unit:
   bypassing a digital down converter in the at least one processing unit by adjusting the first rate as a multiple of a processing rate of the at least one processing unit and a carrier frequency as a multiple of the processing rate of the at least one processing unit when the at least one processing unit is coupled to a modulator,
   separating the sampled signal into sub-bands at the processing rate less than the first rate,
   recombining the separated signal from the sub-bands at the processing rate; and correcting a frequency offset or centering the recombined signal at the processing rate.

13. The method for reducing power consumption on the radio frequency to digital receiver of claim 12, wherein separating the sampled signal comprises time multiplexing the sampled signal into each sub-band when the at least one processing unit is coupled to the modulator.

14. The method for reducing power consumption on the radio frequency to digital receiver of claim 12, further comprising configuring the at least one processing unit by setting up a plurality of digital bandpass filters and the digital down converter in the at least one processing unit through a controller or bypassing the plurality of digital bandpass filters and the digital down converter in the at least one processing unit through the controller.

15. The method for reducing power consumption on the radio frequency to digital receiver of claim 12, wherein the at least one processing unit comprises a plurality of processing units, the method further comprising adjusting a processing rate of a previous processing unit of the plurality of processing units as a multiple of a processing rate of a current processing unit of the plurality of processing units and adjusting an intermediate frequency as the multiple of the processing rate of the current processing unit of the plurality of processing units.

16. The method for reducing power consumption on the radio frequency to digital receiver of claim 12, wherein the at least one processing unit comprises a plurality of processing units and wherein separating the sampled signal comprises time multiplexing outputs of a previous processing unit of the plurality of processing units into each sub-band in a current processing unit of the plurality of processing units.

\* \* \* \* \*